United States Patent
Iiyama (10) Patent No.: US 11,926,536 B2
(45) Date of Patent: Mar. 12, 2024

(54) METHOD FOR STARTING UP HOT ULTRAPURE WATER PRODUCTION SYSTEM, AND HOT ULTRAPURE WATER PRODUCTION SYSTEM

(71) Applicant: Nomura Micro Science Co., Ltd., Kanagawa (JP)

(72) Inventor: Masamitsu Iiyama, Kanagawa (JP)

(73) Assignee: Nomura Micro Science Co., Ltd., Kanagawa (JP)

( * ) Notice: Subject to any disclaimer, the term of this patent is extended or adjusted under 35 U.S.C. 154(b) by 0 days.

(21) Appl. No.: 17/876,624

(22) Filed: Jul. 29, 2022

(65) Prior Publication Data
US 2023/0135621 A1    May 4, 2023

(30) Foreign Application Priority Data
Oct. 29, 2021 (JP) ................. 2021-177165

(51) Int. Cl.
  *C02F 1/02*    (2023.01)
  *F24D 17/00*   (2022.01)
  *C02F 103/04*  (2006.01)

(52) U.S. Cl.
  CPC ............ *C02F 1/02* (2013.01); *F24D 17/0026* (2013.01); *F24D 17/0078* (2013.01); *C02F 2103/04* (2013.01)

(58) Field of Classification Search
  CPC .......... C02F 1/02; C02F 2103/04; C02F 1/00; C02F 1/42; F24D 17/0026; F24D 17/0078
  See application file for complete search history.

(56) References Cited

U.S. PATENT DOCUMENTS

2004/0109788 A1* 6/2004 Li ..................... C02F 1/02
                                                    422/3

FOREIGN PATENT DOCUMENTS

| JP | 08281233 A  | * 10/1996 |
| JP | H08281233   | * 10/1996 |
| JP | 2010-123897 |   6/2010  |
| JP | 2013-202610 |  10/2013  |
| JP | 2013202581  | * 10/2013 |
| JP | 2013202581 A| * 10/2013 |
| JP | 2014-217830 |  11/2014  |
| JP | 2017-200683 |  11/2017  |

(Continued)

OTHER PUBLICATIONS

Reasons for Refusal dated Nov. 14, 2022 From the Korean Intellectual Property Office Re. Application No. 10-2022-0089494 and Its Translation Into English. (7 Pages).

(Continued)

*Primary Examiner* — Frantz F Jules
*Assistant Examiner* — Martha Tadesse (57) ABSTRACT

A method for starting up a hot ultrapure water production system that produces hot ultrapure water by heating ultrapure water to a supply water temperature, for supplied to a point of use, the method involving: alternately passing heated water and cooled water through a hot ultrapure water pipe through which the hot ultrapure water flows, the heated water being obtained by heating the ultrapure water to a temperature higher than room temperature and the cooled water being obtained by cooling the ultrapure water to a temperature lower than the temperature of the heated water in a range of from room temperature to the supply water temperature.

9 Claims, 5 Drawing Sheets

(56) References Cited

FOREIGN PATENT DOCUMENTS

| | | | |
|---|---|---|---|
| JP | 2018-043228 | | 3/2018 |
| JP | 2019-152411 | | 9/2019 |
| JP | 2021-120988 | | 8/2021 |
| KR | 10-2019-0051897 | | 5/2019 |
| TW | 200938491 | * | 9/2009 |
| WO | WO 2020/105494 | | 5/2020 |

OTHER PUBLICATIONS

Notice of Reasons for Refusal dated Dec. 14, 2021 From the Japan Patent Office Re. Application No. 2021-177165 and Its Translation Into English. (3 Pages).

* cited by examiner

METHOD FOR STARTING UP HOT ULTRAPURE WATER PRODUCTION SYSTEM, AND HOT ULTRAPURE WATER PRODUCTION SYSTEM

CROSS-REFERENCE TO RELATED APPLICATION

This application is based on and claims priority from Japanese Patent Application No. 2021477165 filed on Oct. 29, 2021, the disclosures of which are incorporated by reference herein.

BACKGROUND

Technical Field

The present disclosure relates to a method for starting up a hot ultrapure water production system, and a hot ultrapure water production system.

Related Art

Hot ultrapure water having a temperature increased to a predetermined level is employed as ultrapure water used in a semiconductor manufacturing process to enhance, for example, cleaning effects during a cleaning process. According to Japanese Patent Application Laid-Open (JP-A) No. 2010-123897, primary pure water is heated by an ultrapure water heater and supplied to a point of use.

A system for producing hot ultrapure water typically employs a polyvinylidene fluoride (PVDF) pipe. However, on the startup of a hot ultrapure water production system, fluorine is leached from the PVDF pipe, which increases a fluorine concentration in hot ultrapure water.

In order to eliminate such inconvenience, JP-A No. 2010423897 discloses an approach for washing a point of use pipe with water having a temperature higher than that of hot ultrapure water to be supplied.

That is, according to JP-A No. 2010423897, washing the point of use pipe with rinse water having a high temperature accelerates leaching of fluorine from the point of use pipe and reduces an amount of leaching in a short time, thereby obtaining a desired water quality.

SUMMARY

However, the aforementioned approach is insufficient for reducing time for starting up a hot ultrapure water production system in practice. Furthermore, washing a point of use pipe with water having a temperature higher than that of hot ultrapure water to be supplied may cause deformation, strength reduction, and deterioration (hereinafter referred to as "deterioration" collectively) of the point of use pipe. If the deterioration of the point of use pipe is accelerated, other leached materials and microparticles are generated, which causes a decline in water quality.

An object of the present disclosure is to reduce time for starting up a hot ultrapure water production system while preventing deterioration of a hot ultrapure water pipe.

In a first aspect of a method for starting up a hot ultrapure water production system that produces hot ultrapure water by heating ultrapure water to a supply water temperature, for supply to a point of use, the method involves alternately passing heated water and cooled water through a hot ultrapure water pipe through which the hot ultrapure water flows, the heated water being obtained by heating the ultrapure water to a temperature higher than room temperature and the cooled water being obtained by cooling the ultrapure water to a temperature lower than the temperature of the heated water in a range of from room temperature to the supply water temperature.

In other words, in this method for starting up a hot ultrapure water production system, the heated water and the cooled water are alternately passed through the hot ultrapure water pipe. The heated water is ultrapure water having a temperature higher than room temperature but equal to or lower than the supply water temperature, and the cooled water is ultrapure water having a temperature lower than the heated water hut equal to or higher than room temperature.

Passing the heated water slightly expands the hot ultrapure water pipe. In contrast, passing the cooled water slightly contracts the hot ultrapure water pipe. Accordingly, the hot ultrapure water pipe is expanded and contracted by the heated water and the cooled water alternately passing therethrough. Compared with a case, for example, where the heated water and ultrapure water having the supply water temperature are passed, expanding and contracting the hot ultrapure water pipe in this manner enables leaching of fluorine contained in the hot ultrapure water pipe in a short time and reduces time for starting up a hot ultrapure water production system.

The heated water and the cooled water have a temperature in a range of from room temperature to the supply water temperature, or temperature of water to be supplied to the point of use. In other words, there is no need to heat or cool the ultrapure water excessively.

Since the heated water has a temperature equal to or lower than the supply water temperature, it is possible to prevent deterioration of the hot ultrapure water pipe compared with a case where water having a temperature over the supply water temperature is passed through the hot ultrapure water pipe.

In a second aspect of the method for starting up a hot ultrapure water production system, the hot ultrapure water production system is provided with a water temperature regulator configured to adjust a temperature of the ultrapure water to the supply water temperature, and the method involves the heating and the cooling of the ultrapure water using the water temperature regulator.

Since the water temperature regulator included in the hot ultrapure water production system heats and cools the ultrapure water, there is no need to control temperature increase and decrease using separate devices for heating and cooling other than the water temperature regulator. In other words, it is possible to easily heat and cool the ultrapure water.

In a third aspect of the method for starting up a hot ultrapure water production system, the heated water has a temperature equal to or higher than a temperature that is 10° C. lower than the supply water temperature.

In other words, the heated water has a temperature equal to or lower than the supply water temperature and is kept within a certain range close to the supply water temperature, which reliably exerts the effect of expanding the hot ultrapure water pipe. In a case where the heated water has a temperature lower than the temperature 10° C. lower than the supply water temperature (for example, when the supply water temperature has a temperature of 75° C., the heated water has a temperature less than 65° C.), there is a possibility that the heated water does not expand the hot ultrapure water pipe sufficiently. However, having a temperature equal to or higher than the temperature 10° C. lower than the supply water temperature, the heated water sufficiently expands the hot ultrapure water pipe.

In a fourth aspect of the method for starting up a hot ultrapure water production system, the cooled water has a temperature of 50° C. or less.

In this manner, setting the maximum temperature of the cooled water enables the cooled water to contract the hot ultrapure water pipe reliably. In a case where the cooled water has a temperature over 50° C., there is a possibility that the cooled water does not contract the hot ultrapure water pipe sufficiently. However, having a temperature of 50° C. or less, the cooled water sufficiently contracts the hot ultrapure water pipe.

In a fifth aspect of the method for starting up a hot ultrapure water production system, the heated water is passed through the hot ultrapure water pipe for from 3 to 24 consecutive hours per water passing.

Since the heated water is passed through the hot ultrapure water pipe for from 3 to 24 consecutive hours per water passing, it is possible to expand the hot ultrapure water pipe reliably by the heated water compared with a case where the heated water is passed for less than consecutive 3 hours.

Furthermore, since the heated water is passed through the hot ultrapure water pipe for consecutive 24 hours or less per water passing, it is possible to prevent excessive increase in time for passing the heated water compared with a case where the heated water is passed over consecutive 24 hours.

In a sixth aspect of the method for starting up a hot ultrapure water production system, the cooled water is passed through the hot ultrapure water pipe for from 3 to 24 consecutive hours or less per water passing.

Since the cooled water is passed through the hot ultrapure water pipe for consecutive 3 hours or more per water passing, it is possible to contract the hot ultrapure water pipe reliably by the cooled water compared with a case where the cooled water is passed for less than consecutive 3 hours.

Furthermore, since the cooled water is passed through the hot ultrapure water pipe for consecutive 24 hours or less per water passing, it is possible to prevent excessive increase in time for passing the cooled water compared with a case where the cooled water is passed over consecutive 24 hours.

In a seventh aspect of the method for starting up a hot ultrapure water production system, the modulus of temperature change per unit time during the heating and cooling of the ultrapure water is 0.2° C./min or more and 5.0° C./min or less.

Since the modulus of temperature change per unit time during the heating and cooling of the ultrapure water is set to 5.0° C./min or less, the temperature changes gently. For this reason, it is possible to prevent deterioration of the hot ultrapure water pipe compared with a case where the temperature changes sharply.

Furthermore, since the modulus of temperature change is set to 0.2° C./min or more, it is possible to prevent excessive increase in time required for temperature change.

In an eighth aspect of the method for starting up a hot ultrapure water production system, the heated water and the cooled water are passed through the hot ultrapure water pipe in a water passing cycle repeated from three to ten times, the water passing cycle involving a single passage of the heated water and a single passage of the cooled water.

Repeating the water passing cycle three times or more enables leaching of fluorine from the hot ultrapure water pipe reliably compared with a case where the water passing cycle is repeated twice or less.

Repeating the water passing cycle ten times or less does not require excessive water passing cycle and enables reduction in time for the startup compared with a case where the water passing cycle is repeated eleven times or more.

In a ninth aspect of the method for starting up a hot ultrapure water production system, the heated water and the cooled water are alternately passed through the hot ultrapure water pipe before the hot ultrapure water is supplied to the point of use from the hot ultrapure water production system.

Accordingly, it is possible to prevent leaching of fluorine into the hot ultrapure water to be supplied to the point of use.

In a tenth aspect of a non-transitory computer-readable recording medium recorded with a program for starting up a hot ultrapure water production system that produces hot ultrapure water by heating ultrapure water up to supply water temperature, for supply to a point of use, the program executable by a computer to perform processing, the processing comprising: alternately passing heated water and cooled water through a hot ultrapure water pipe through which the hot ultrapure water flows, the heated water being obtained by heating the ultrapure water up to a temperature higher than room temperature and the cooled water being obtained by cooling the ultrapure water to a temperature lower than the temperature of the heated water in a range of from room temperature to the supply water temperature.

That is, in this program for starting up a hot ultrapure water production system, a computer executes processing of alternately passing the heated water and the cooled water through the hot ultrapure water pipe. The heated water is ultrapure water having a temperature higher than room temperature but equal to or lower than the supply water temperature, and the cooled water is ultrapure water having a temperature lower than the heated water but equal to or higher than room temperature.

Passing the heated water slightly expands the hot ultrapure water pipe. In contrast, passing the cooled water slightly contracts the hot ultrapure water pipe. In other words, the hot ultrapure water pipe is expanded and contracted by the heated water and the cooled water alternately passing therethrough. Compared with a case, for example, where the heated water and ultrapure water having the supply water temperature are passed, expanding and contracting the hot ultrapure water pipe in this manner enables leaching of fluorine contained in the hot ultrapure water pipe in a short time. Accordingly, the hot ultrapure water pipe becomes ready for the production of hot ultrapure water, which reduces time for starting up a hot ultrapure water production system.

The heated water and the cooled water have a temperature in a range of from room temperature to the supply water temperature, or temperature of water to be supplied to the point of use. In other words, there is no need to heat or cool the ultrapure water excessively.

Since the heated water has a temperature equal to or lower than the supply water temperature, it is possible to prevent deterioration of the hot ultrapure water pipe compared with a case where water having a temperature over the supply water temperature is passed through the hot ultrapure water pipe.

An eleventh aspect of a hot ultrapure water production system includes: an ultrapure water production device configured to produce ultrapure water; a water temperature regulator configured to regulate a temperature of the ultrapure water produced by the ultrapure water production device and increase the temperature of the ultrapure water up to a supply water temperature, or for supply to a point of use, to obtain hot ultrapure water; a hot ultrapure water pipe through which the hot ultrapure water flows, the hot ultrapure water pipe being disposed inside the water temperature regulator and between the water temperature regulator and the point of use; and a controller configured to control the water temperature regulator so as to alternately prepare heated water obtained by increasing the temperature of the ultrapure water to higher than room temperature and cooled water obtained by decreasing the temperature of the ultrapure water to lower than the temperature of the heated water in a range of from room temperature to the supply water temperature, for supply to the point of use.

In this hot ultrapure water production system, temperature of the ultrapure water produced by the ultrapure water production device is regulated and increased by the water temperature regulator until the temperature reaches the supply water temperature, or temperature of water to be supplied to the point of use. The hot ultrapure water is supplied to the point of use through the hot ultrapure water pipe.

In this hot ultrapure water production system, the controller controls the water temperature regulator so as to alternately prepare the heated water and the cooled water. The hot ultrapure water pipe is disposed inside the water temperature regulator and between the water temperature regulator and the point of use, and the heated water and the cooled water are alternately passed through this hot ultrapure water pipe.

The hot ultrapure water pipe expands and contracts by the heated water and the cooled water alternately passing therethrough, which enables leaching of fluorine contained in the hot ultrapure water pipe in a short time and reduces time for starting up a hot ultrapure water production system compared with a case, for example, where the heated water is simply passed.

The heated water and the cooled water have a temperature in a range of from room temperature to the supply water temperature, or temperature of water to be supplied to the point of use. In other words, there is no need to heat or cool the ultrapure water excessively.

Since the heated water has a temperature equal to or lower than the supply water temperature, it is possible to prevent deterioration of the hot ultrapure water pipe compared with a case where water having a temperature over the supply water temperature is passed through the hot ultrapure water pipe.

Furthermore, employing this hot ultrapure water production system makes it possible to separate a process for producing ultrapure water and a process for producing hot ultrapure water from the ultrapure water. In other words, after the production of ultrapure water from which impurities are removed by the ultrapure water production device, the water temperature regulator regulates temperature of this ultrapure water to obtain hot ultrapure water. In the process for producing hot ultrapure water, it is sufficient to regulate temperature of the ultrapure water, which minimizes a process for water temperature regulation. For this reason, in the ultrapure water temperature production device, an amount of impurities flowing during the process for water temperature regulation is reduced and startup time in the process for water temperature regulation is reduced. Accordingly, it is possible to limit damage to the hot ultrapure water pipe when starting up the hot ultrapure water production system, which enables the production of high-purity hot ultrapure water over long periods. Particularly, employing the method for starting up according to the technique of the disclosure in this hot ultrapure water production system makes it possible to start up the hot ultrapure water production system in a shorter time.

A twelfth aspect of a hot ultrapure water production system includes: an ultrapure water production device configured to produce ultrapure water; a water temperature regulator configured to regulate a temperature of the ultrapure water produced by the ultrapure water production device and increase the temperature of the ultrapure water to a supply water temperature, for supply to a point of use, to obtain hot ultrapure water; and a hot ultrapure water pipe through which the hot ultrapure water flows, the hot ultrapure water pipe being disposed inside the water temperature regulator and between the water temperature regulator and the point of use, wherein the ultrapure water production device includes: an ion exchange device configured to remove foreign matter from water to be treated by ion exchange; a first ultrafiltration membrane located downstream of the ion exchange device in a flow direction of the water to be treated, the water temperature regulator includes: a heat exchanger configured to exchange heat between the ultrapure water and a heat medium; and a second ultrafiltration membrane located downstream of the heat exchanger in a flow direction of the ultrapure water, and the hot ultrapure water pipe includes: an ultrapure water pipe through which the ultrapure water directly flows from the ultrapure water production device to the point of use; and a branched pipe branching off from the ultrapure water pipe and causing the ultrapure water to flow to the water temperature regulator.

In this hot ultrapure water production system, temperature of the ultrapure water produced by the ultrapure water production device is regulated and increased by the water temperature regulator until the temperature reaches the supply water temperature, or temperature of water to be supplied to the point of use. The hot ultrapure water is supplied to the point of use through the hot ultrapure water pipe.

The ultrapure water production device includes the ion exchange device and efficiently removes foreign matters from the water to be treated by ion exchange. Furthermore, the ultrapure water production device includes the first ultrafiltration membrane located downstream of the ion exchange device in a flow direction of the water to be treated, which makes it possible to remove foreign matters which the ion exchange device cannot remove. This makes it possible to obtain high-purity ultrapure water from which the foreign matters are sufficiently removed.

The water temperature regulator includes the heat exchanger and is configured to efficiently regulate temperature by heat exchange between the ultrapure water and the heat medium and to heat the ultrapure water until the temperature reaches the supply water temperature, or temperature of water to be supplied to the point of use. Since the water temperature regulator includes the second ultrafiltration membrane, even though foreign matters are generated in parts located upstream of the water temperature regulator, it is possible to remove the foreign matters before supplying hot ultrapure water to the point of use.

In this manner, a series of process to obtain the hot ultrapure water is achieved by a series of process in the ion exchange device, the first ultrafiltration membrane, the heat exchanger, and the second ultra-filtration membrane.

Furthermore, in the water temperature regulator, the heat exchanger exchanges heat between the ultrapure water and the heat medium so that it is possible not only to obtain hot ultrapure water heated up to the supply water temperature but also to set temperature of the ultrapure water to a desired temperature. For example, it is possible to alternately prepare heated water obtained by increasing the temperature of the ultrapure water higher than room temperature and cooled water obtained by decreasing the temperature of the ultrapure water lower than the temperature of the heated water in a range of from room temperature to the supply water temperature, or temperature of water to be supplied to the point of use. The heated water and the cooled water are alternately passed through the hot ultrapure water pipe.

The hot ultrapure water pipe expands and contracts by the heated water and the cooled water alternately passing therethrough, which enables leaching of fluorine contained in the hot ultrapure water pipe in a short time and reduces time for starting up a hot ultrapure water production system compared with a case, for example, where the heated water is simply passed.

The heated water and the cooled water have a temperature in a range of from room temperature to the supply water temperature, or temperature of water to be supplied to the point of use. In other words, there is no need to heat or cool the ultrapure water excessively.

Since the heated water has a temperature equal to or lower than the supply water temperature, it is possible to prevent deterioration of the hot ultrapure water pipe compared with a case where water having a temperature over the supply water temperature is passed through the hot ultrapure water pipe.

In addition, this hot ultrapure water production system enables the water temperature regulator to have a minimal configuration including, for example, the heat exchanger and the second ultrafiltration membrane as substantial elements responsible for the process to produce hot ultrapure water. Such a minimal configuration of the water temperature regulator is preferable in that it is possible to speed up the startup of the hot ultrapure water production system and to enable continuous supply of high-purity hot ultrapure water.

Advantageous Effects of Invention

In the present disclosure, deterioration of a hot ultrapure water pipe is prevented, and time for starting up a hot ultrapure water production system is reduced.

BRIEF DESCRIPTION OF THE DRAWINGS

Exemplary embodiments of the present disclosure will be described in detail based on the following figures, wherein.

DETAILED DESCRIPTION

Hereinafter, a hot ultrapure water production system 12 according to a first embodiment will be described with reference to the drawings.

Figure 1:
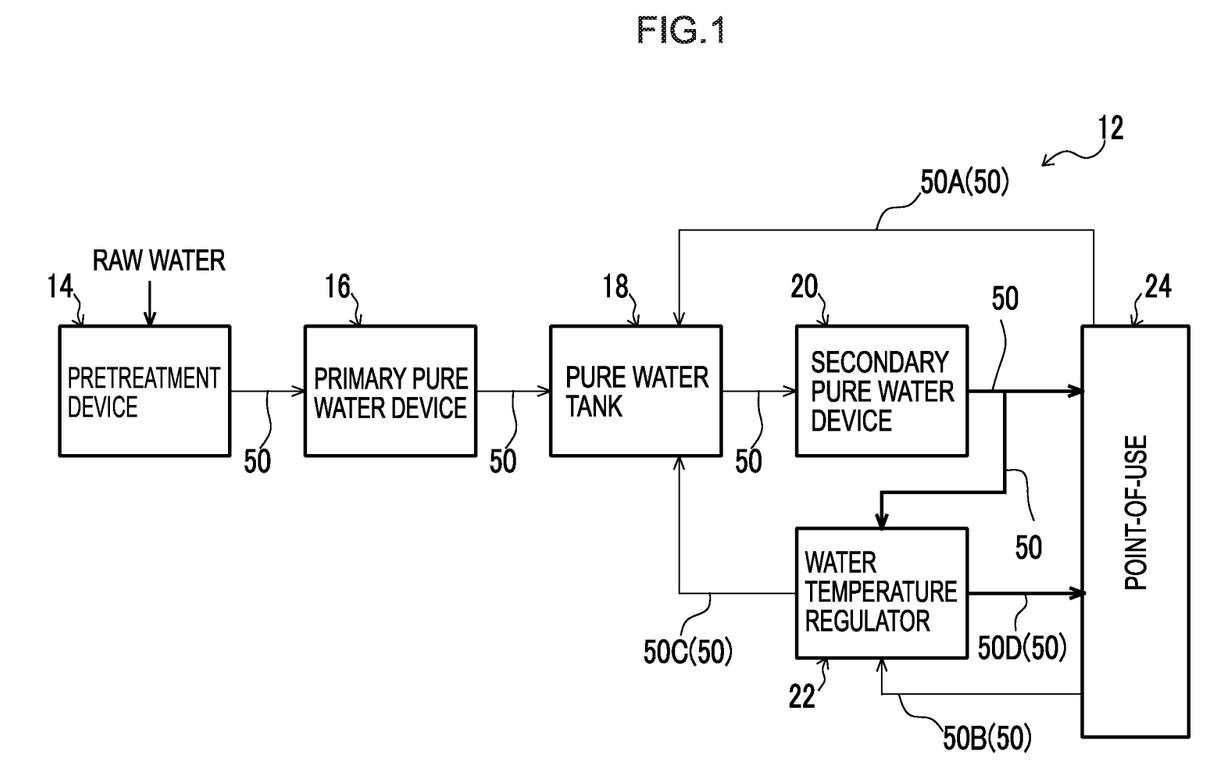
FIG. 1 illustrates a configuration of a hot ultrapure water production system according to a first embodiment.

The hot ultrapure water production system 12 according to the first embodiment includes a pretreatment device 14, a primary pure water device 16, a pure water tank 18, a secondary pure water device 20, a water temperature regulator 22, and a point of use 24.

Raw water is supplied to the pretreatment device 14. Examples of the raw water include industrial water, tap water, groundwater, and river water.

The pretreatment device 14 performs clarification and the like to remove part of suspended matters and organic matters in the raw water, thereby obtaining pretreated water. Note that the pretreatment device 14 may be omitted depending on the quality of the raw water.

The primary pure water device 16 uses an adsorbent such as activated carbon to adsorb particles remaining in the pretreated water and also uses a membrane filtration device such as reverse osmosis membrane device to remove inorganic ions, organic matters, microparticles, and the like. The primary pure water device 16 may also include an ion exchange device and an ultraviolet irradiation device. The ion exchange device removes ions and the like remaining in the pretreated water. The primary pure water device 16 may also use a membrane degasifier to remove a dissolved gas such as dissolved oxygen from the pretreated water.

The order of these various types of devices in the primary pure water device 16, that is, the order of the devices in a flow direction of the pretreated water is not specifically limited and is designed adequately for each treatment.

The primary pure water device 16 performs purification to remove impurities from the pretreated water obtained in the pretreatment device 14 in this manner if necessary, thereby obtaining primary pure water.

The primary pure water obtained in the primary pure water device 16 is supplied to the pure water tank 18. The pure water tank 18 is a reservoir for temporarily retaining the primary pure water obtained in the primary pure water device 16.

The primary pure water retained in the pure water tank 18 is supplied to the secondary pure water device 20.

Figure 2:
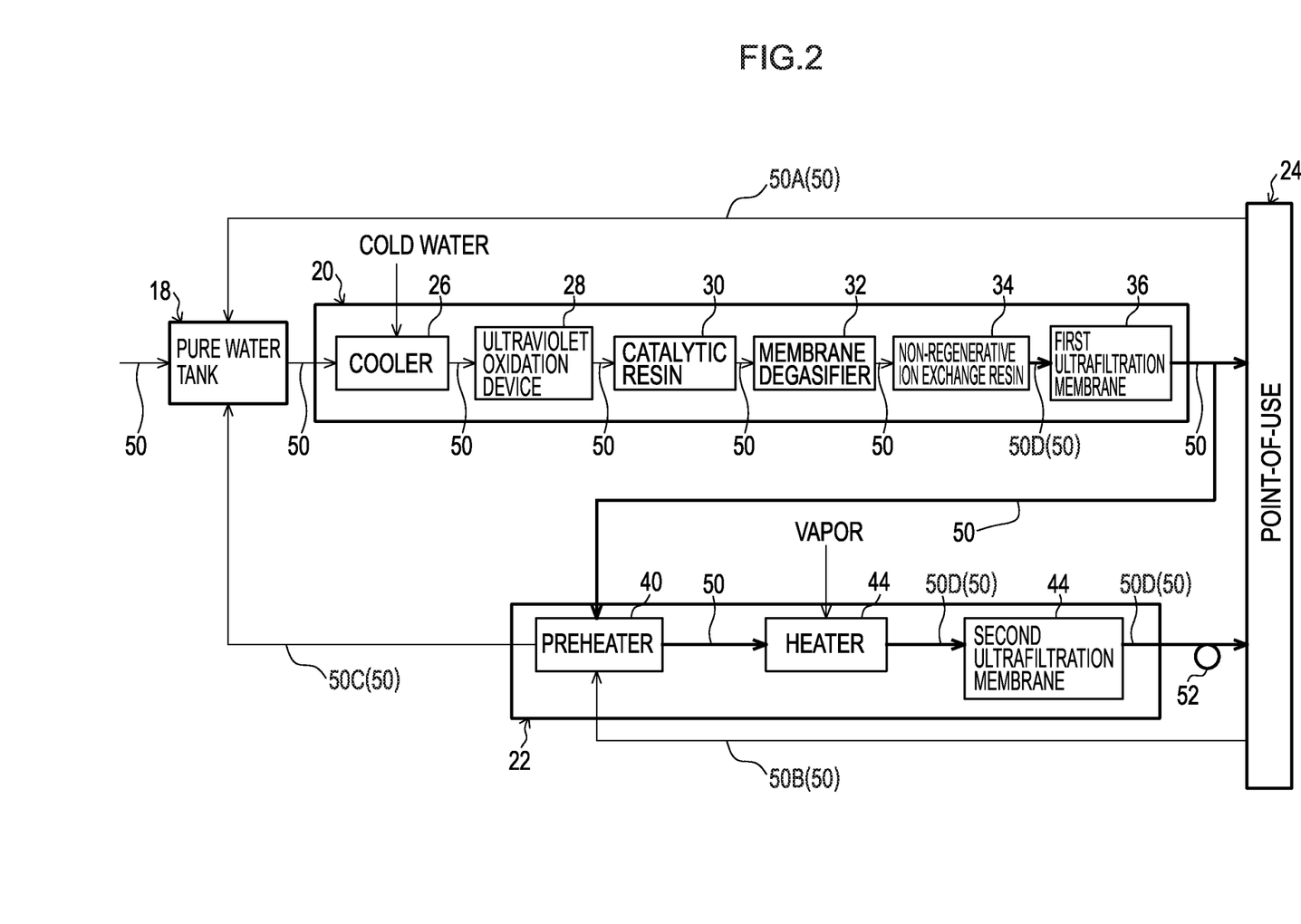
FIG. 2 illustrates a partial configuration of the hot ultrapure water production system according to the first embodiment.

As illustrated in FIG. 2, the secondary pure water device 20 according to the first embodiment includes a cooler 26, an ultraviolet oxidation device 28, a catalytic resin 30, a membrane degasifier 32, a non-regenerative ion exchange resin 34, and a first ultrafiltration membrane 36 in this order in a flow direction of the supplied primary pure water (water to be treated).

The cooler 26 is a heat exchanger that exchanges heat between the primary pure water and a cooling medium supplied from a cooling source (not illustrated) (for example, cold water) to cool the primary pure water. For example, the cooler 26 decreases temperature of the primary pure water from about 25° C. to 23° C.

The ultraviolet oxidation device 28 irradiates the primary pure water with ultraviolet rays to decompose organic matters contained in the primary pure water. Accordingly, total organic carbon (TOC) contained in the primary pure water is reduced.

The ultraviolet irradiation by the ultraviolet oxidation device 28 causes hydrogen peroxide in the primary pure water. The catalytic resin 30 decomposes this hydrogen peroxide catalytically. Specifically, the catalytic resin 30 causes a reaction of $H_2O_2 \rightarrow H_2O + (\frac{1}{2})O_2$.

The membrane degasifier 32 removes a gas such as dissolved oxygen contained in the primary pure water by membrane degasification. Specifically, for example, the interior of the membrane degasifier 32 is partitioned into gas phase and liquid phase by a hollow fiber membrane. While the primary pure water is poured into the liquid phase, the gas phase is evacuated so that the gas in the primary pure water permeates the hollow fiber membrane and migrates to the gas phase, whereby an amount of gas contained in the primary pure water is reduced.

Note that the ultraviolet oxidation device 28, the catalytic resin 30, and the membrane degasifier 32 may be omitted depending on the type of ultrapure water required in the point of use 24.

The non-regenerative ion exchange resin 34 exchanges ions with the primary pure water to adsorb a trace amount of ions contained in the primary pure water, thereby removing the ions from the primary pure water. Note that this non-regenerative ion exchange resin 34 is of "non-regenerative" type which removes ions attached to the ion exchange resin and does not regenerate ions, enabling removal of the ions in the primary pure water with high removal rate.

The first ultrafiltration membrane 36 removes foreign matters contained in the primary pure water that are not removed by the parts located upstream of the first ultrafiltration membrane 36. Flowing through the secondary pure water device 20, the primary pure water turns into secondary pure water, that is, ultrapure water from which the foreign matters are removed further.

The ultrapure water may be directly supplied to the point of use 24. Since temperature of the ultrapure water is regulated by the cooler 26 to, for example, about 23° C., when the ultrapure water having this temperature is used at the point of use 24, the ultrapure water is directly supplied to the point of use 24. In addition, in the hot ultrapure water production system according to the first embodiment 12, the ultrapure water may be supplied to the water temperature regulator 22, and then, the temperature of the ultrapure water may be regulated.

The water temperature regulator 22 includes a preheater 40, a heater 42, and a second ultrafiltration membrane 44.

The preheater 40 is a heat exchanger that exchanges heat between the ultrapure water (having a temperature of about 23° C.) supplied from the secondary pure water device 20 and after-mentioned hot ultrapure water (having a temperature of about 75° C.) returned to the point of use 24. The preheater 40 heats the ultrapure water, or the water to be treated, by this heat exchange and increases the temperature of the ultrapure water. For examples, the preheater 40 increases the temperature of the ultrapure water to from about 60° C. to 70° C. The preheater 40 may employ an existing heat exchanger such as plate-type heat exchanger.

The heater 42 is a heat exchanger that exchanges heat between the ultrapure water and a heat medium supplied from a heat source (not illustrated) (for example, vapor supplied from a boiler) to heat the ultrapure water further. The heated ultrapure water has temperature of water to be supplied to the point of use 24, that is, supply water temperature. This embodiment is designed to use hot ultrapure water having a temperature of 75° C. in the point of use 24. For this reason, the heater 42 increases the temperature of the ultrapure water up to the supply water temperature, that is, 75° C., thereby obtaining hot ultrapure water. The heater 42 may employ an existing heat exchanger such as plate-type heat exchanger.

In the water temperature regulator 22, for example, the preheater 40 and the heater 42 may be combined as long as the ultrapure water is heated appropriately to reach a desired temperature range.

The second ultrafiltration membrane 44 removes foreign matters contained in the hot ultrapure water that are not removed by the parts located upstream of the second ultrafiltration membrane 44. For example, foreign matters generated in the preheater 40 and the heater 42 are removed by the second ultrafiltration membrane 44. Accordingly, the hot ultrapure water reaches a state where the foreign matters are further removed.

Particularly, in this embodiment, the hot ultrapure water heated by the heater 42, or heated water, is treated by the second ultrafiltration membrane 44. For this reason, a membrane adaptable to temperature of the hot ultrapure water is employed as the second ultrafiltration membrane 44.

In the first embodiment, each of the aforementioned elements are connected by a pipe 50, and water is designed to flow from the pretreatment device 14 through the primary pure water device 16, the pure water tank 18, and the secondary pure water device 20 toward the point of use 24. Furthermore, the pipe 50 from the secondary pure water device 20 to the point of use 24 is branched in midstream and connected to the water temperature regulator 22, and the water temperature regulator 22 and the point of use 24 are also connected by the pipe 50. With this configuration, the ultrapure water produced in the secondary pure water device 20 is supplied to the point of use 24 by two lines, that is, a straight line from the secondary pure water device 20 to the point of use 24 and a line via the water temperature regulator 22 to the point of use 24.

The point of use 24 and the pure water tank 18 are connected by a first return pipe 50A, which enables the ultrapure water not used in the point of use 24 to return to the pure water tank 18. Furthermore, the point of use 24 and the preheater 40 are connected by a second return pipe 50B, which enables the hot ultrapure water not used in the point of use 24 to return to the preheater 40. Still further, the preheater 40 and the pure water tank 18 are connected by a third return pipe 50C, which enables the ultrapure water to return from the preheater 40 to the pure water tank 18.

As described above, the preheater 40 exchanges heat between the ultrapure water (having a temperature of about 23° C.) supplied from the secondary pure water device 20 and the hot ultrapure water (having a temperature of about 75° C.) returned to the point of use 24. The heat-exchanged ultrapure water has a temperature of, for example, from about 28° C. to 30° C. and is returned to the pure water tank 18 via the third return pipe 50C.

Among a plurality of pipes 50 illustrated in FIGS. 1 and 2, those indicated by thick lines employ a material from which fluorine leaches by passing water therethrough, and specifically, polyvinylidene fluoride (PVDF) is employed in this embodiment. However, compared with other materials, PVDF leaches little fluorine and little impurities derived from the material and has high heat resistance. Hereinafter, polyvinylidene fluoride pipe is specifically referred to as "PVDF pipe". Specifically, as illustrated in FIG. 2, the pipe 50 from the non-regenerative ion exchange resin 34 of the secondary pure water device 20 to the point of use 24 and the pipe 50 branched from the foregoing pipe 50 and passing through the water temperature regulator 22 toward the point of use 24 are both PVDF pipes. Particularly, the PVDF pipe from the heater 42 to the point of use 24 is an example of a hot ultrapure water pipe 50D that is used for passing the hot ultrapure water.

Note that the pipes 50 other than the PVDF pipes are not limited in material and may employ resin such as polypropylene and metals such as stainless steel.

The pipe 50 (PVDF pipe) between the second ultrafiltration membrane 44 and the point of use 24 is provided with a fluorine ion concentration sensor 52. This fluorine ion concentration sensor 52 measures fluorine ion concentrations of the hot ultrapure water, heated water (to be described), and cooled water (to be described) flowing from the second ultrafiltration membrane 44 to the point of use 24.

Figure 3:
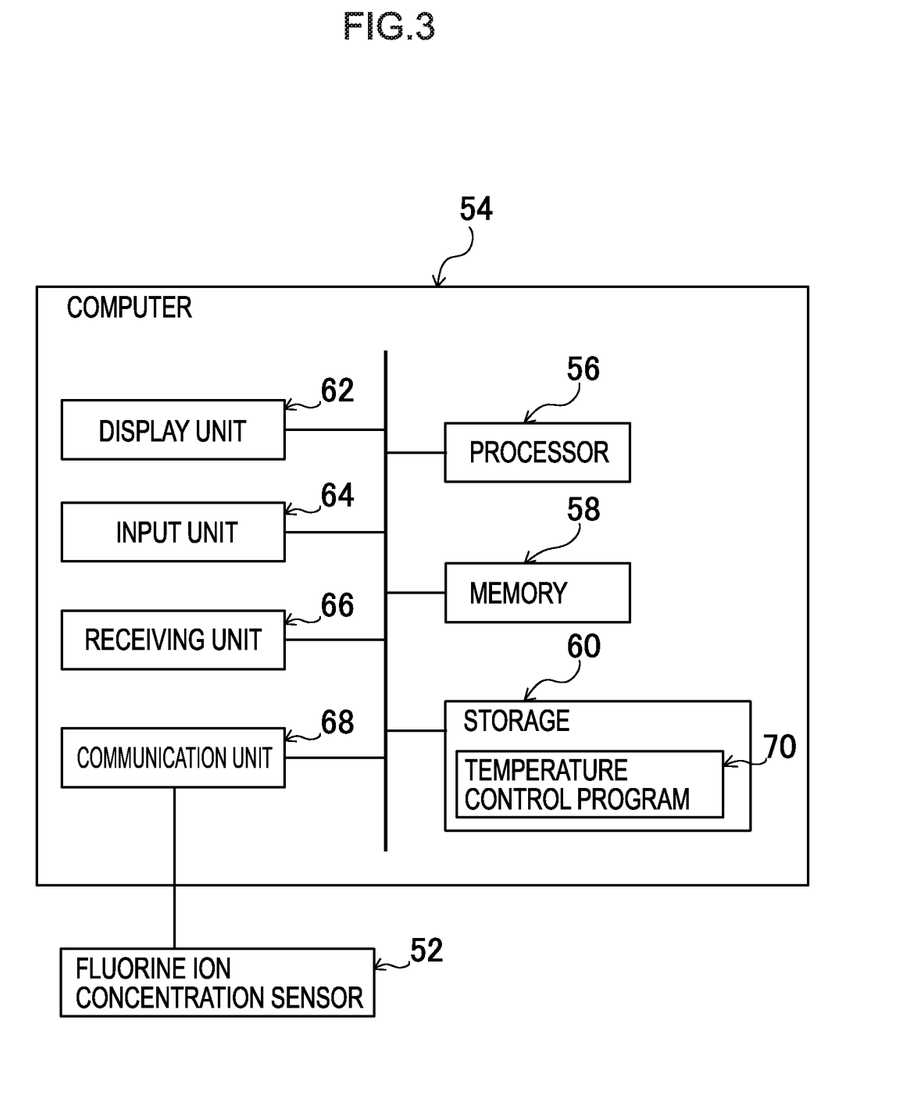
FIG. 3 illustrates a computer serving as a controller for the hot ultrapure water production system according to the first embodiment.

FIG. 3 illustrates an internal configuration of the computer 54 that controls the startup of the hot ultrapure water production system 12 in the first embodiment. The computer 54 is, for example, a controller for controlling the water temperature regulator 22.

The computer 54 includes a processor 56, a memory 58, a storage 60, a display unit 62, an input unit 64, a receiving unit 66, and a communication unit 68.

The storage 60 stores a control program 70 for causing the computer 54 to operate as a controller. This control program is developed by the memory 58 and executed by the processor 56 to cause the computer 54 to function as a controller.

Examples of the display unit 62 include a display and a displaying lamp. The display unit 62 shows, for example, the status of the computer 54 and the statuses of various kinds of devices connected to this computer 54.

Examples of the input unit 64 include keyboard, mouse, and switch. The input unit 64 receives various kinds of input put into the computer 54 by an operator.

As will be described, on the startup of the hot ultrapure water production system 12, the receiving unit 66 receives instruction to implement a method for the startup according to the technique of this disclosure. Substantially, a part of the input unit 64 may be configured to function as the receiving unit 66. The display unit 62 may be a touch panel and may have a dual role as the input unit 64 and the receiving unit 66.

Furthermore, in the first embodiment, the cooler 26, the preheater 40, and the heater 42 are all heat exchangers, and these heat exchangers have an outlet for the ultrapure water (including the hot ultrapure water) provided with a temperature sensor. Data detected by the temperature sensor is transmitted to the computer 54. The computer 54 adjusts temperature regulating valves of these heat exchangers to regulate water temperature.

Hereinafter described are effects of the first embodiment and a method for starting up the hot ultrapure water production system 12. Note that the "startup" represents controlling the condition of the installed but unused hot ultrapure water production system 12 until the hot ultrapure water production system 12 practically supplies desired hot ultrapure water to the point of use 24. Particularly, in this embodiment, the "startup" represents reduction of fluorine ions leaching from the hot ultrapure water pipe 50D (the PVDF pipe from the heater 42 to the point of use 24) to a level that does not affect the use of hot ultrapure water in the point of use 24.

Since a PVDF pipe contains fluorine as an impurity in its initial state, passing ultrapure water through the PVDF pipe causes leaching of fluorine into the ultrapure water. Particularly, passing hot ultrapure water through the PVDF pipe causes leaching of fluorine, and the fluorine is easily mixed in the hot ultrapure water. For example, when ultrapure water is used in a semiconductor manufacturing process, the ultrapure water containing fluorine causes a decline in semiconductor yield. Therefore it is desired to reduce the fluorine content in ultrapure water used in the semiconductor manufacturing process.

In order to reduce the fluorine content in hot ultrapure water to be supplied to the point of use 24, the hot ultrapure water is passed through the hot ultrapure water pipe 50D at the time of starting up the hot ultrapure water production system 12, that is, when the hot ultrapure water is not used in the point of use 24. In other words, in the method, the hot ultrapure water is passed through the hot ultrapure water pipe 50D to leach fluorine of the hot ultrapure water pipe 50D into the hot ultrapure water before the practical use of the hot ultrapure water production system 12. The hot ultrapure water used for water passing is not used in the point of use 24 and does not affect the semiconductor manufacturing process even though the hot ultrapure water contains fluorine.

In a case where hot ultrapure water is passed through the hot ultrapure water pipe 50D in this manner to leach fluorine from the hot ultrapure water pipe 50D, passing hot ultrapure water with a higher temperature enables leaching of fluorine in a shorter time, which reduces time for the startup. However, passing hot ultrapure water with too high a temperature through the hot ultrapure water pipe 50D accelerates deterioration of the hot ultrapure water pipe 50D. For example, passing hot ultrapure water having a temperature of 80° C. or higher through the hot ultrapure water pipe 50D easily accelerates deterioration of the hot ultrapure water pipe 50D. For this reason, from a perspective of preventing deterioration of the hot ultrapure water pipe 50D, it is desirable not to increase temperature of hot ultrapure water used for water passing. However, hot ultrapure water having a low temperature reduces an amount of fluorine leached per unit time, which takes a long time to start up the hot ultrapure water production system 12.

Therefore, the first embodiment according to the technique of this disclosure employs the following method to start up the hot ultrapure water production system 12. Before the startup, for example, after the hot ultrapure water production system 12 is installed at a predetermined site, ultrapure water prepared in the secondary pure water device 20 and having a temperature equal to room temperature is allowed to flow in the water temperature regulator 22 to sterilize and clean the interior of the water temperature regulator 22.

Specifically, the computer 54 executes the temperature control program 70 to control the water temperature regulator 22 in the following manner. That is, the computer 54 alternately prepares heated water obtained by heating the ultrapure water up to a temperature higher than room temperature by the water temperature regulator 22 and cooled water obtained by cooling the ultrapure water to a temperature lower than the temperature of this heated water by the water temperature regulator 22. Note that temperature of the ultrapure water is regulated in a range of from room temperature to the temperature of water to be supplied to the point of use 24 (supply water temperature). Accordingly, the maximum temperature of the heated water is the supply water temperature and the minimum temperature of the heated water is, for example, 10° C. lower than the supply water temperature. Furthermore, the minimum temperature of the cooled water is room temperature and the maximum temperature of the cooled water is, for example, 50° C. Note that "room temperature" herein represents temperature of the ultrapure water before being regulated by the water temperature regulator 22, that is, 23° C. in this embodiment.

Figure 4:
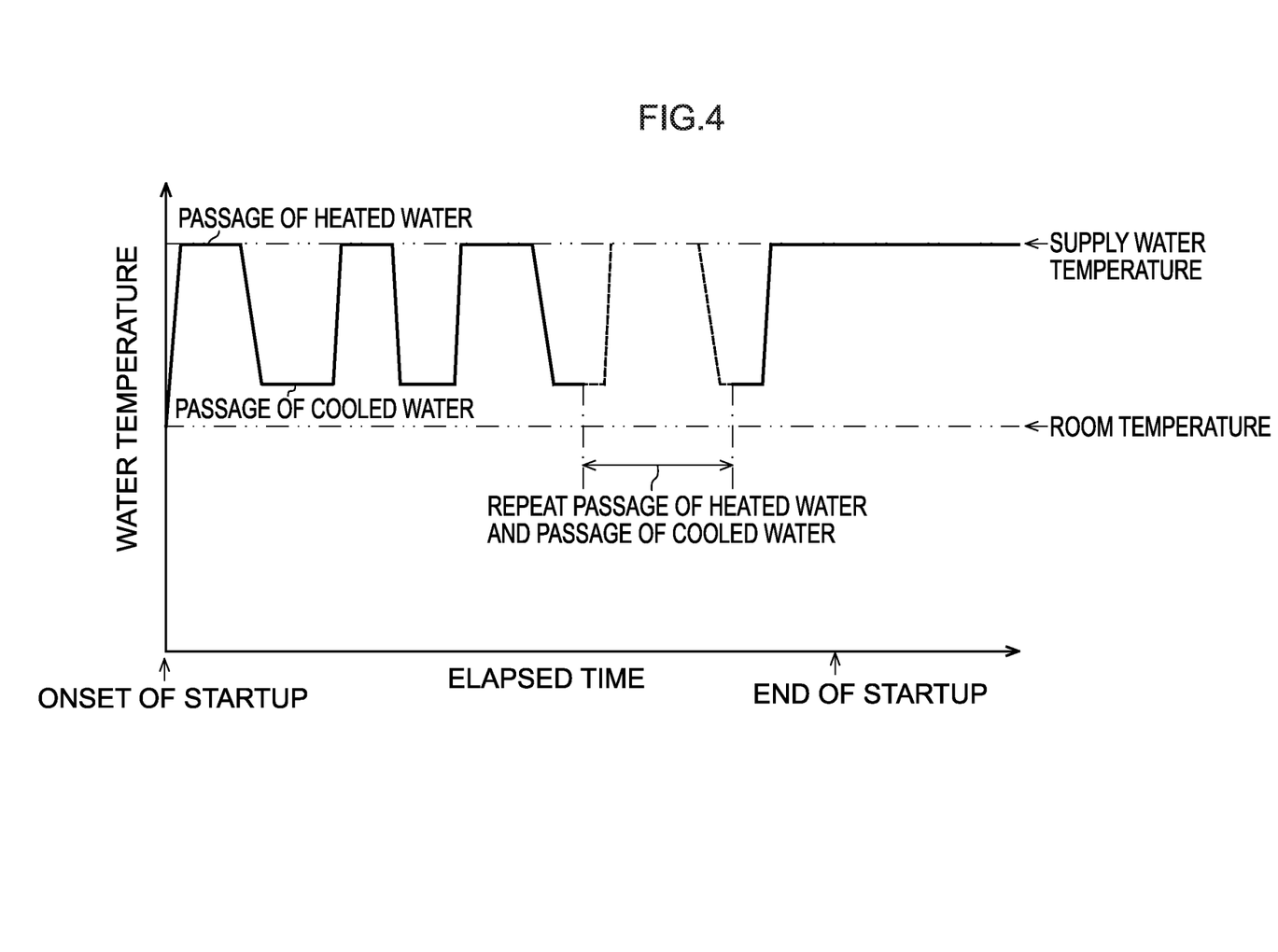
FIG. 4 is a graph illustrating the time course of time change when passing heated water and cooled water in the hot ultrapure water production system according to the first embodiment.

As illustrated in FIG. 4, the heated water and the cooled water are alternately passed through the hot ultrapure water pipe 50D. Herein, a single passage of the heated water through the hot ultrapure water pipe 50D and a subsequent single passage of the cooled water through the hot ultrapure water pipe 50D are referred to as one "water passing cycle". In this embodiment, this water passing cycle is repeated several times. The water passing cycle may be repeated, for example, predetermined number of times set in advance. Note that time for passing the heated water may vary between the water passing cycles, and similarly, time for passing the cooled water may vary between the passing cycles.

In this embodiment, the water passing cycle may be stopped based on a value of fluorine ion concentration measured by the fluorine ion concentration sensor 52. In other words, when the fluorine ion concentration measured by the fluorine ion concentration sensor 52 reaches a predetermined value or less, the water passing cycle may be stopped to substantially end the startup of the hot ultrapure water production system 12.

Instead of the fluorine ion concentration sensor 52 for detecting the fluorine ion concentration, for example, a sampling cock may be installed at the site of the fluorine ion concentration sensor 52, and water sample may be analyzed offline (that is, outside the hot ultrapure water production system 12) to measure the fluorine ion concentration. In either case where the fluorine ion concentration is detected using the fluorine ion concentration sensor 52 or where the fluorine ion concentration is analyzed offline using water sample, the minimum and maximum number of water passing cycles may be predetermined (for example, minimum three cycles and maximum ten cycles). Furthermore, based on a tendency of fluorine ion concentration per water passing cycle, it is possible to determine whether or not to continue the water passing cycle. In this case, after the number of water passing cycles reaches the maximum or after the water passing cycle is ended, hot ultrapure water having the supply water temperature is continuously supplied to the point of use 24, and periodically, the fluorine ion concentration sensor 52 is used or the water sample is analyzed offline to verify the end of the startup. According to this method for the startup, it is possible to suppress an excessive rise in the number of repetitions of heating and cooling ultrapure water, which successfully prevents deterioration of a hot ultrapure water pipe.

Passing the heated water through the PVDF pipe slightly expands the PVDF pipe. In contrast, passing the cooled water through the PVDF pipe slightly contracts the PVDF pipe. In other words, the PVDF pipe expands and contracts (repeats expansion and contraction) by the heated water and the cooled water alternately passing therethrough. The problem in PVDF is that fluorine-containing components as unreacted products of a raw material during the synthesis or fluorine-containing components present in polymerization-defective portions are desorbed and mixed into hot ultrapure water. Particularly, the unreacted products of the raw material are held inside the molecular skeleton of PVDF. In the technique of this disclosure, the expansion and contraction of the PVDF pipe squeezes out the fluorine-containing components held inside the molecular skeleton or held in gaps of polymer structures, thereby discharging the components.

In contrast, passing constant-temperature ultrapure water through the PVDF pipe just expands or contracts the PVDF pipe but does not expand and contract the PVDF pipe. For example, in a case where ultrapure water to be passed through the hot ultrapure water pipe 50D is hot ultrapure water having the temperature of water to be supplied to the point of use 24 (supply water temperature), the PVDF pipe is likely to expand compared with a case where ultrapure water having room temperature is passed through the hot ultrapure water pipe 50D. However, passing the constant-temperature hot ultrapure water does not cause contraction of the hot ultrapure water pipe 50D. For this reason, this case does not cause the phenomenon of squeezing out and discharging the fluorine-containing components.

In the technique of the present disclosure, a material to be employed in the hot ultrapure water pipe 50D is preferably PVDF as described above but the material is not limited thereto. Any material may be used as long as the material withstands temperature of the hot ultrapure water to be supplied to the point of use 24, and an example of the material includes resin such as polyethylene terephthalate (PTFE).

In the method for starting up the hot ultrapure water production system 12 according to the disclosure, expanding and contracting the hot ultrapure water pipe 50D in this manner increases an amount of fluorine ions leached per unit time compared with a case where constant-temperature ultrapure water is passed through the hot ultrapure water pipe 50D. Increasing an amount of fluorine ions leached from the hot ultrapure water pipe 50D per unit time reduces time for reducing an amount of fluorine ions contained in the hot ultrapure water pipe 50D, which reduces the time for the startup.

A state where an amount of fluorine ions leached from the hot ultrapure water pipe 50D is sufficiently reduced is "the end of the startup". After the end of the startup, hot ultrapure water regulated to have the temperature of water to be supplied to the point of use 24 (supply water temperature) is supplied to the point of use 24.

Figure 5:
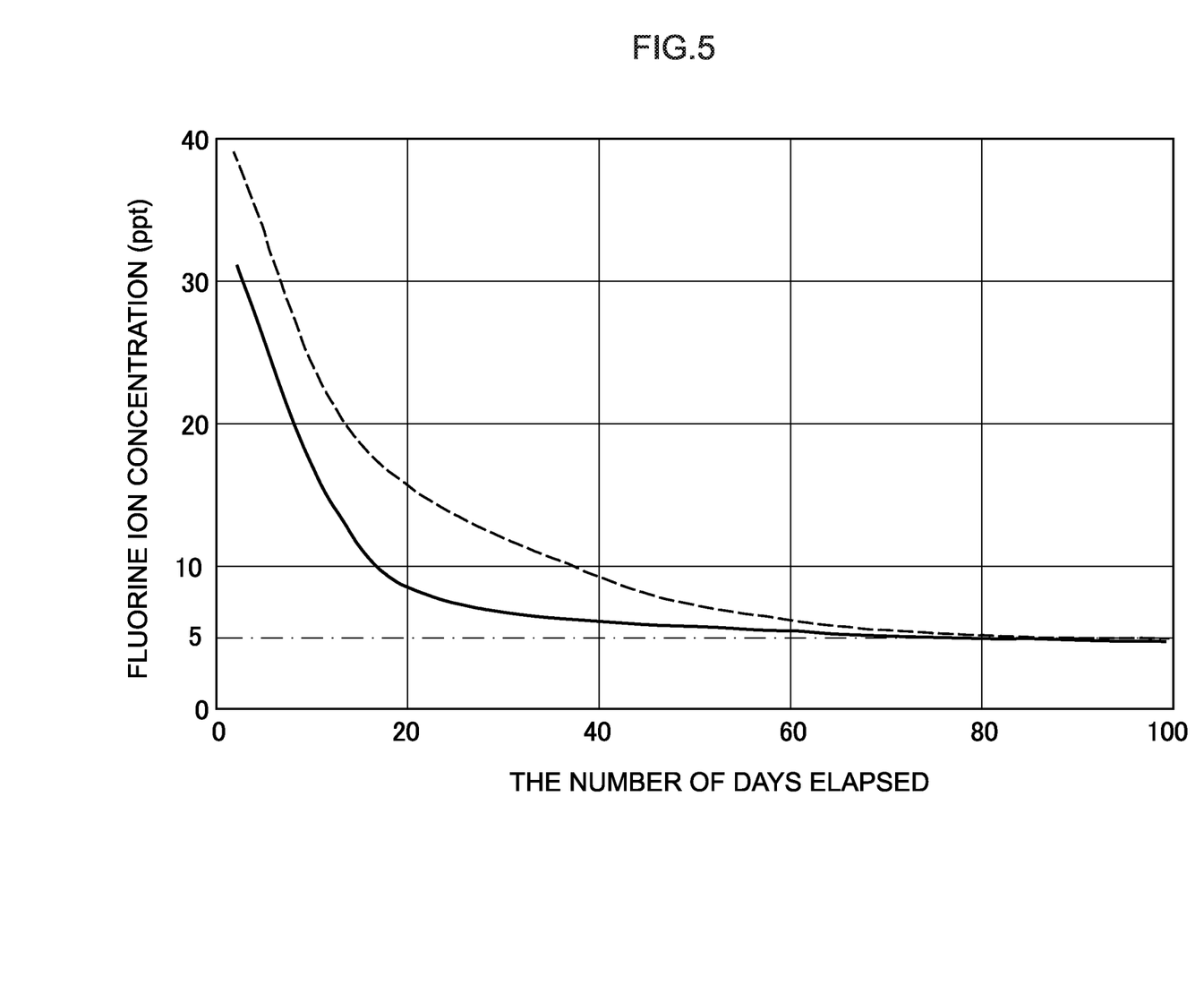
FIG. 5 is a graph illustrating the relation between the number of days elapsed from the onset of starting up the hot ultrapure water production system according to the first embodiment and the fluorine ion concentration.

FIG. 5 illustrates the relation between the number of days elapsed from the onset of starting up the hot ultrapure water production system 12 according to the first embodiment and the fluorine ion concentration measured at the point of use 24. In Example 1 indicated by a dashed line and Example 2 indicated by a solid line, the startup of the hot ultrapure water production system 12 is performed under different conditions.

As an example, a time point when the fluorine ion concentration reaches 5 ppt is set as a benchmark of the end of starting up the hot ultrapure water production system 12. A fluorine ion concentration of 5 ppt is an exemplary benchmark required in the semiconductor manufacturing process.

For example, when hot ultrapure water having the temperature of water to be supplied to the point of use 24 (supply water temperature), that is, a temperature of 75° C., is continuously passed through the hot ultrapure water pipe 50D, it takes from 90 to 100 days to reduce the fluorine ion concentration to 5 ppt.

In contrast, it takes about 70 days in Example 1 and about 60 days in Example 2 in the technique of the disclosure to reduce the fluorine ion concentration to 5 ppt.

In this manner, the technique of the disclosure reduces the time for starting up the hot ultrapure water production system 12.

In the technique of the disclosure, the water temperature regulator 22 is used to obtain heated water and cooled water from ultrapure water obtained by the secondary pure water device 20. The water temperature regulator 22 is disposed in the hot ultrapure water production system 12 to heat the ultrapure water and obtain hot ultrapure water. In order to obtain the heated water and the cooled water for obtaining the hot ultrapure water, there is no need to place a heat exchanger separately from the water temperature regulator 22, which enables a simple configuration of the hot ultrapure water production system 12. In addition, since there is no need to control the separate heat exchanger, it is possible to easily facilitate the method for starting up the hot ultrapure water production system 12.

The water temperature regulator 22 is separated from the secondary pure water device 20, and after producing ultrapure water from which impurities are sufficiently removed by the secondary pure water device 20, the water temperature regulator 22 regulates temperature of this ultrapure water to obtain the hot ultrapure water. The water temperature regulator 22 will do as long as it substantially regulates temperature of the ultrapure water, which enables a minimal configuration of the water temperature regulator 22 (and minimizes a process for water temperature regulation). With this configuration, an amount of impurities flowing into the water temperature regulator 22 (in the process for water temperature regulation) is reduced, and the time for the startup in the process for water temperature regulation is reduced. Accordingly, it is possible to limit damage to the hot ultrapure water pipe 50D when starting up the hot ultrapure water production system 12, which enables the production of high-purity hot ultrapure water over long periods.

Furthermore, the water temperature regulator 22 will do as long as it includes, the heat exchanger (the preheater 40 and the heater 42, or a heat exchanger including these heaters in an integrated manner) and the second ultrafiltration membrane 44 as in the technique of the disclosure. Minimizing the configuration of the water temperature regulator 22 in this manner speeds up the startup of the hot ultrapure water production system 12 and enables continuous supply of the high-purity hot ultrapure water.

In the technique of the disclosure, the minimum temperature of the heated water is set to a temperature 10° C. lower than the supply water temperature of the hot ultrapure water to be supplied to the point of use 24. In other words, the heated water has a temperature equal to or higher than the temperature 10° C. lower than the supply water temperature. Accordingly, the heated water has a temperature kept within a certain range close to the supply water temperature, which reliably exerts the effect of expanding the hot ultrapure water pipe 50D. For example, in a case where the temperature of water to be supplied to the point of use 24 (supply water temperature) is 75° C. and the heated water has a temperature less than 65° C., there is a possibility that the heated water does not expand the hot ultrapure water pipe 50D sufficiently. In contrast, setting the temperature of the heated water equal to or higher than the temperature 10° C. lower than the supply water temperature (in the above example, 65° C. or more and 75° C. or less) makes it possible to expand the hot ultrapure water pipe 50D sufficiently.

In the technique of the disclosure, a period for passing the heated water through the hot ultrapure water pipe 50D per water passing is not particularly limited and may be, for example, consecutive 3 hours or more and 24 hours or less. Passing the heated water for consecutive 3 hours or more enables the heated water to expand the hot ultrapure water pipe 50D reliably.

Furthermore, since the period for passing the heated water through the hot ultrapure water pipe 50D per water passing is consecutive 24 hours or less, it is possible to prevent an excessive increase in the time for passing the heated water, which contributes to reduction in time for starting up the hot ultrapure water production system 12.

In the technique of the disclosure, the maximum temperature of the cooled water is 50° C. Setting the maximum temperature of the cooled water enables the cooled water to contract the hot ultrapure water pipe 50D reliably. For example, in a case where the cooled water has a temperature over 50° C., there is a possibility that the cooled water does not contract the hot ultrapure water pipe 50D sufficiently. However, having a temperature of 50° C. or less, the cooled water sufficiently contracts the hot ultrapure water pipe 50D.

It is a matter of course that the cooled water is designed to have a temperature lower than that of the heated water while being kept within this temperature range (room temperature or more and 50° C. or less). Temperature may be set appropriately depending on conditions of the supply water temperature: for example, in a case where the hot ultrapure water to be supplied to the point of use 24 has a temperature of 40° C. and the heated water has a temperature of 35° C., the cooled water is set to have a temperature of 30° C.

In the technique of the disclosure, a period for passing the cooled water through the hot ultrapure water pipe 50D per water passing is not particularly limited and may be, for example, consecutive 3 hours or more and 24 hours or less. Passing the cooled water for consecutive 3 hours or more enables the cooled water to contract the hot ultrapure water pipe 50D reliably.

Furthermore, since the period for passing the cooled water through the hot ultrapure water pipe 50D per water passing is consecutive 24 hours or less, it is possible to prevent an excessive increase in the time for passing the cooled water, which contributes to reduction in time for starting up the hot ultrapure water production system 12.

In the technique of the disclosure, the heated water and the cooled water have a temperature in a range of from room temperature to temperature of water to be supplied to the point of use 24 (supply water temperature). Since temperature of the heated water does not increase excessively, it is possible to prevent deterioration of the hot ultrapure water pipe 50D attributed to the passage of the hot ultrapure water. For example, passing ultrapure water having a temperature of about 80° C. may accelerate deterioration of the hot ultrapure water pipe 50D, but such a problem is not a concern in the technique of this disclosure.

In the technique of the disclosure, when the water temperature regulator 22 heats and cools the ultrapure water, a rate of change per unit time is not particularly limited and may be set to 0.2° C./min or more and 5.0° C./min or less as the modulus of temperature change per time during the heating and cooling. Setting the modulus of temperature change to 5.0° C./min or less causes gentle change in temperature, which reduces the effect on deterioration of the hot ultrapure water pipe 50D compared with a case where the temperature changes sharply.

Furthermore, setting the modulus of temperature change to 0.2° C./min or more prevents an excessive increase in time required for temperature change from the heated water to cooled water and from the cooled water to heated water, which contributes to reduction in time for starting up the hot ultrapure water production system 12.

In the technique of the disclosure, the number of cycles of passing water through the hot ultrapure water pipe is set to, for example, three or more and ten or less. Repeating the water passing cycle three times or more enables leaching of fluorine from the hot ultrapure water pipe 50D reliably compared with a case where the water passing cycle is repeated twice or less.

Still further, repeating the water passing cycle ten times or less does not require excessive water passing cycle and enables reduction in time for the startup compared with a case where the water passing cycle is repeated eleven times or more.

In the technique of the disclosure, as a method for starting up the hot ultrapure water production system 12, the heated water and the cooled water are passed through the hot ultrapure water pipe 50D before supplying the hot ultrapure water from the hot ultrapure water production system 12 to the point of use 24. The hot ultrapure water is supplied to the point of use 24 in a stage where fluorine is sufficiently leached from the hot ultrapure water pipe 50D, whereby it is possible to prevent leaching of fluorine into this hot ultrapure water.

In the technique of the disclosure, the hot ultrapure water production system 12 includes the non-regenerative ion exchange resin 34 (an example of ion exchange device), the first ultrafiltration membrane 36, the heater 42 (an example of heat exchanger), and the second ultrafiltration membrane 44. With this configuration, water to be treated flows through the non-regenerative ion exchange resin 34 (an example of ion exchange device) and the first ultrafiltration membrane 36 in this order in the secondary pure water device 20, thereby obtaining ultrapure water. Furthermore, this ultrapure water flows through the heater 42 and the second ultrafiltration membrane 44 in this order so that temperature of the ultrapure water is increased to the temperature of water to be supplied to the point of use 24 (supply water temperature), thereby obtaining hot ultrapure water from which foreign matters are removed further. Still further, a process for preparing the ultrapure water by the secondary pure water device 20 to a process for obtaining the heated water and the cooled water by the water temperature regulator 22 are achieved in a continuous flow of the ultrapure water.

What is claimed is:

1. A method for starting up a hot ultrapure water production system that produces hot ultrapure water by heating ultrapure water to a supply water temperature for supply to a point of use, the method comprising:
alternately passing heated water and cooled water through a hot ultrapure water pipe made of a polyvinylidene fluoride (PVDF), through which ultrapure water pipe the hot ultrapure water flows, the heated water being obtained by heating the ultrapure water to a temperature higher than room temperature and the cooled water being obtained by cooling the ultrapure water to a temperature lower than the temperature of the heated water in a range of from room temperature to the supply water temperature, the passing of the heated water through the ultrapure water pipe being for from 3 to 24 consecutive hours per water passing and the passing of the cooled water through the ultrapure water pipe being for from 3 to 24 consecutive hours or less per water passing, thereby leaching fluorine contained in the hot ultrapure water pipe, as a part of a starting up of the ultrapure water production system.

2. The method according to claim 1, wherein:
the hot ultrapure water production system is provided with a water temperature regulator configured to adjust a temperature of the ultrapure water to the supply water temperature, and
the method comprises the heating and the cooling of the ultrapure water using the water temperature regulator.

3. The method according to claim 2, wherein the heated water has a temperature equal to or higher than a temperature that is 10° C. lower than the supply water temperature.

4. The method according to claim 3, wherein the cooled water has a temperature of 50° C. or less.

5. The method according to claim 1, wherein no modulus of change of the temperature of the ultrapure water during the heating and cooling of the ultrapure water is lower than 0.2° C. per minute and no modulus of change of the temperature of the ultrapure water during the heating and cooling of the ultrapure water is higher than 5.0° C. per minute.

6. The method according to claim 1, wherein the heated water and the cooled water are passed through the hot ultrapure water pipe in a water passing cycle repeated from three to ten times, the water passing cycle involving a single passage of the heated water and a single passage of the cooled water.

7. The method according to claim 1, wherein the heated water and the cooled water are alternately passed through the hot ultrapure water pipe before the hot ultrapure water is supplied to the point of use from the hot ultrapure water production system.

8. A hot ultrapure water production system, comprising:
an ultrapure water production device configured to produce ultrapure water;
a water temperature regulator configured to regulate a temperature of the ultrapure water produced by the ultrapure water production device and increase the temperature of the ultrapure water to a supply water temperature for supply to a point of use, to obtain hot ultrapure water;
a hot ultrapure water pipe made of a polyvinylidene fluoride (PVDF), through which ultrapure water pipe the hot ultrapure water flows, the hot ultrapure water pipe being disposed inside the water temperature regulator and between the water temperature regulator and the point of use; and
a controller configured to control the water temperature regulator so as to alternately prepare heated water obtained by increasing the temperature of the ultrapure water to higher than room temperature and cooled water obtained by decreasing the temperature of the ultrapure water to lower than the temperature of the heated water in a range of from room temperature to the supply water temperature for supply to the point of use, the heated water passing through the ultrapure water pipe for from 3 to 24 consecutive hours per water passing and the cooled water passing through the ultrapure water pipe for from 3 to 24 consecutive hours or less per water passing, thereby to leach fluorine contained in the hot ultrapure water pipe, as a part of a starting up of the ultrapure water production system.

9. A hot ultrapure water production system, comprising:
an ultrapure water production device configured to produce ultrapure water;
a water temperature regulator configured to regulate a temperature of the ultrapure water produced by the ultrapure water production device and increase the temperature of the ultrapure water to a supply water temperature for supply to a point of use, to obtain hot ultrapure water; and
a hot ultrapure water pipe through which the hot ultrapure water flows, the hot ultrapure water pipe being disposed inside the water temperature regulator and between the water temperature regulator and the point of use, wherein:
the ultrapure water production device comprises:
an ion exchange device configured to remove foreign matter from water to be treated by ion exchange;
a first ultrafiltration membrane located downstream of the ion exchange device in a flow direction of the water to be treated, the water temperature regulator includes:
a heat exchanger configured to exchange heat between the ultrapure water and a heat medium; and
a second ultrafiltration membrane located downstream of the heat exchanger in a flow direction of the ultrapure water, and the hot ultrapure water pipe comprising:
an ultrapure water pipe through which the ultrapure water directly flows from the ultrapure water production device to the point of use; and
a branched pipe branching off from the ultrapure water pipe and causing the ultrapure water to flow to the water temperature regulator.

\* \* \* \* \*